United States Patent
Won et al.

(10) Patent No.: US 8,697,812 B2
(45) Date of Patent: Apr. 15, 2014

(54) PREPARATION METHOD OF SUPERABSORBENT POLYMER

(75) Inventors: Tae-Young Won, Daejeon (KR); Chang-Sun Han, Daejeon (KR); Gi-Cheul Kim, Daejeon (KR); Sang-Gi Lee, Daejeon (KR); Kyu-Pal Kim, Yeosu-si (KR); Sung-Soo Park, Seoul (KR); Gyu Leem, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/824,952

(22) PCT Filed: Nov. 22, 2011

(86) PCT No.: PCT/KR2011/008926
§ 371 (c)(1),
(2), (4) Date: Oct. 29, 2013

(87) PCT Pub. No.: WO2012/070845
PCT Pub. Date: May 31, 2012

(65) Prior Publication Data
US 2014/0058048 A1    Feb. 27, 2014

(30) Foreign Application Priority Data

Nov. 22, 2010 (KR) .................. 10-2010-0116164

(51) Int. Cl.
*C08F 8/00* (2006.01)
*C08J 3/24* (2006.01)
*B01J 20/30* (2006.01)

(52) U.S. Cl.
CPC .. *C08J 3/247* (2013.01); *C08J 7/08* (2013.01); *C08J 2335/00* (2013.01); *C08F 2500/14* (2013.01); *C08F 2810/20* (2013.01); *B01J 20/3078* (2013.01); *C08J 3/245* (2013.01)
USPC ............. 525/326.1; 502/402; 525/330.3; 525/330.6; 525/384; 526/319

(58) Field of Classification Search
CPC .................................. C08J 3/247; C08J 7/08
See application file for complete search history.

(56) References Cited

U.S. PATENT DOCUMENTS

| | | | |
|---|---|---|---|
| 5,250,640 A | 10/1993 | Irie et al. | |
| 5,275,773 A | 1/1994 | Irie et al. | |
| 6,087,002 A | 7/2000 | Kimura et al. | |
| 2004/0157734 A1 * | 8/2004 | Mertens et al. | 502/401 |
| 2009/0299315 A1 * | 12/2009 | Flohr et al. | 604/368 |
| 2010/0035757 A1 * | 2/2010 | Furno et al. | 504/360 |
| 2010/0222758 A1 * | 9/2010 | Dairoku et al. | 604/367 |

FOREIGN PATENT DOCUMENTS

| | | |
|---|---|---|
| JP | 56-161408 | 12/1981 |
| JP | 57-158209 | 9/1982 |
| JP | 57-198714 | 12/1982 |
| JP | 07-185331 | 7/1995 |
| JP | 10-500712 | 1/1998 |
| JP | 2005-194524 | 7/2005 |
| JP | 2010-053296 | 3/2010 |
| JP | 4583516 | 9/2010 |
| KR | 1993-007306 | 8/1993 |
| KR | 1994-0006901 | 7/1994 |
| KR | 1994-0008994 | 9/1994 |
| KR | 10-0317398 | 10/2002 |
| KR | 10-0504592 | 7/2005 |
| KR | 10-0678288 | 1/2007 |
| KR | 10-2011-0049072 | 5/2011 |
| WO | WO 94/22502 | 10/1994 |
| WO | WO 95/27739 | 10/1995 |

* cited by examiner

*Primary Examiner* — Robert C Boyle
(74) *Attorney, Agent, or Firm* — McKenna Long & Aldridge, LLP

(57) ABSTRACT

The present invention relates to a method of preparing a superabsorbent polymer, including the steps of: preparing a hydrous gel phase polymer by thermal polymerizing or photo-polymerizing a monomer composition including a water-soluble ethylene-based unsaturated monomer and a polymerization initiator; drying the hydrous gel phase polymer; milling the dried polymer; adding a surface cross-linking agent to the milled polymer; and elevating the temperature of the polymer including the surface cross-linking agent at a speed of 3° C./min to 15° C./min, and carrying out a surface cross-linking reaction at 100° C. to 250° C.

16 Claims, No Drawings

PREPARATION METHOD OF SUPERABSORBENT POLYMER

This application is a National Stage Entry of International Application No. PCT/KR2011/008926, filed Nov. 22, 2011, and claims the benefit of Korean Patent Application No. 10-2010-0116164, filed on Nov. 22, 2010, all of which are hereby incorporated by reference in their entirety for all purposes as if fully set forth herein.

BACKGROUND OF THE INVENTION (a) Field of the Invention

The present invention relates to a preparation method of a superabsorbent polymer, and specifically to a method of preparing a superabsorbent polymer of which fine powder generation is small, and not only are water holding capacity and absorbing power under pressure excellent, but also the content of a water soluble component is low.

(b) Description of the Related Art

A superabsorbent polymer (SAP) is a synthetic polymer material having a function of absorbing about 500 to about 1000 times its weight of water, and it has been differently called a superabsorbency material (SAM), an absorbent gel material (AGM), and so on by developing enterprises. The superabsorbent polymer disclosed above started to be commercialized for sanitary items, and is now being used widely as a water combination soil for horticulture, a water-stop material for civil engineering and construction, a nursery sheet, a freshness preservative in the food distribution field, a poultice material, and the like in addition to the sanitary fittings like a paper diaper for a child.

An inverse suspension polymerization method or an aqueous polymerization method is known as a method of preparing a superabsorbent polymer. For example, inverse suspension polymerization is disclosed in Japanese Patent Publication Nos. Sho56-161408, Sho57-158209, Sho57-198714, and so on. As the aqueous polymerization method, a thermal polymerization method of polymerizing a hydrous gel phase polymer while fracturing and cooling the same in a kneader equipped with a plurality of spindles, and a photo-polymerization method of exposing a high-concentrated aqueous solution on a belt to UV rays and the like so as to carry out the polymerization and dry it at the same time are known.

Meanwhile, a polymer powder obtained from the processes of polymerization, pulverization, drying, and final milling is surface treated for obtaining a hydrous gel phase polymer having excellent properties, and various modifications of the processes have been attempted for increasing the effects of the steps of polymerization, pulverization, and drying in order to obtain a hydrous gel phase polymer having excellent properties.

SUMMARY OF THE INVENTION

It is an aspect of the present invention to provide a method of preparing a superabsorbent polymer of which fine powder generation is small, and not only are water holding capacity and absorbing power under pressure excellent, but also the content of a water soluble component is low.

The present invention provides a method of preparing a superabsorbent polymer, including the steps of preparing a hydrous gel phase polymer by thermal polymerizing or photo-polymerizing of a monomer composition including a water-soluble ethylene-based unsaturated monomer and a polymerization initiator; drying the hydrous gel phase polymer; milling the dried polymer; adding a surface cross-linking agent to the milled polymer; and elevating the temperature of the polymer including the surface cross-linking agent at a speed of 3° C./min to 15° C./min, and carrying out a surface cross-linking reaction at 100° C. to 250° C.

DETAILED DESCRIPTION OF THE EMBODIMENTS

Hereinafter, the method of preparing the superabsorbent polymer according to a specific embodiment of the present invention is explained in more detail.

According to one embodiment of the present invention, a method of preparing a superabsorbent polymer includes the steps of preparing a hydrous gel phase polymer by thermal polymerizing or photo-polymerizing a monomer composition including a water-soluble ethylene-based unsaturated monomer and a polymerization initiator; drying the hydrous gel phase polymer; milling the dried polymer; adding a surface cross-linking agent to the milled polymer; and elevating the temperature of the polymer including the surface cross-linking agent at a speed of 3° C./min to 15° C./min, and carrying out a surface cross-linking reaction at 100° C. to 250° C.

From the results of research of the present inventors, it was recognized that not only can the efficiency of the surface cross-linking process be improved and the properties of the superabsorbent polymer produced finally be enhanced, but also the generation of fine powder having a particle diameter less than 150 μm can be minimized when the temperature increase for the surface cross-linking reaction is carried out at a speed of 3° C./min to 15° C./min in the process of the surface cross-linking reaction of the polymer that is carried out after the processes of drying and milling the hydrous gel phase polymer.

After the step of adding the surface cross-linking agent to the milled polymer, the temperature increase to the surface cross-linking reaction temperature may be carried out at a speed of 3° C./min to 15° C./min, preferably at 5° C./min to 10° C./min, and more preferably at 6° C./min to 8° C./min.

When the speed of the temperature increase to the surface cross-linking reaction temperature is too fast, the surface cross-linking agent may be unevenly dispersed in the pulverized polymer, or the surface cross-linking depth may be shallow or the surface cross-linking reaction may occur only at a part of the milled polymer because the surface cross-linking agent may not sufficiently penetrate into the milled polymer, and thus the properties of the superabsorbent polymer finally prepared may be deteriorated. Furthermore, when the speed of the temperature increase to the surface cross-linking reaction temperature is too slow and the temperature increase time is delayed a long time, it shows a lower distribution than the desired water absorption magnification because the penetration of the surface cross-linking agent becomes deep, the properties may be deteriorated by excessive reaction, and the milled polymer may be fractured or the ratio of fine powder (for example, the powder having the particle diameter of less than 150 μm) may increase excessively as the residence time in the reactor becomes longer.

That is, in the preparation method of the superabsorbent polymer of one embodiment of the present invention, the speed of temperature increase to the surface cross-linking reaction temperature directly influences the penetration depth of the surface cross-linking agent or the surface cross-linking reaction depth.

In the present specification, "surface cross-linking reaction temperature" may be defined as the average temperature of the reactant including the polymer and the surface cross-linking agent included in the "effective volume of the reactor" for the cross-linking reaction when 70 to 90% of the whole surface cross-linking reaction time has passed, without particular limitation. Further, "effective volume of the reactor" or "volume of the reactor" may be defined as the total volume of the reactant included in the volume of the reactor.

The speed of temperature increase for the surface cross-linking reaction may is represented by the following Formula 1.

Speed of temperature increase (° C./min)=(surface cross-linking reaction temperature−temperature of polymer directly after surface cross-linking agent is added)/time of temperature increase      [Formula 1]

Furthermore, the time of temperature increase in Formula 1 means "the time spent on the temperature increase to the surface cross-linking reaction temperature" directly after the surface cross-linking agent is added, and it may be represented by the following Formula 2.

Time of temperature increase (min)=(effective volume of reactor (m$^3$)/[(feeding speed of polymer (Kg/min)/apparent density of polymer (Kg/m$^3$)]      [Formula 2]

Meanwhile, in the preparation method of the superabsorbent polymer, the temperature for surface cross-linking the polymer to which the surface cross-linking agent is added ("surface cross-linking reaction temperature") may be 100 to 250° C., preferably 120 to 220° C., and more preferably 150 to 200° C. By applying the surface cross-linking reaction temperature of the above range; the surface cross-linking reaction can be evenly carried out throughout the polymer to which the surface cross-linking agent is added, and a part of the polymer being carbonized or not participating in the reaction can be prevented.

Meanwhile, the monomer composition includes a polymerization initiator, and it may include a photo-polymerization initiator in the case of a photo-polymerization method or a thermal polymerization initiator in the case of a thermal polymerization method. However, even in the case of the photo-polymerization method, a thermal polymerization initiator may be additionally included because a certain amount of heat is generated by irradiation of UV rays and the like and a certain amount of heat is generated according to the progress of the exothermic polymerization reaction.

Specifically, at least one initiator selected from the group consisting of a persulfate-based initiator, an azo-based initiator, hydrogen peroxide, and ascorbic acid may be used as the thermal polymerization initiator. More specific examples of the persulfate-based initiator include sodium persulfate ($Na_2S_2O_8$), potassium persulfate ($K_2S_2O_8$), ammonium persulfate (($NH_4)_2S_2O_8$), and the like; and as examples of the azo-based initiator, 2,2-azobis(2-amidinopropane)dihydrochloride, 2,2-azobis-(N,N-dimethylene)isobutyramidine dihydrochloride, 2-(carbamoylazo)isobutylonitril, 2,2-azobis(2-[2-imidazolin-2-yl]propane)dihydrochloride, and 4,4-azobis-(4-cyanovaleric acid) may be used. More various thermal polymerization initiators are well-disclosed in "Principle of Polymerization" written by Odian, (Wiley, 1981), p 203, however the examples of the thermal polymerization initiator are not limited to or by these.

Meanwhile, at least one initiator selected from the group consisting of benzoin ether, a dialkyl acetophenone, a hydroxyl alkylketone, phenyl glyoxylate, benzyl dimethyl ketal, an acyl phosphine, and an α-aminoketone may be used as the photo-polymerization initiator. As the specific example of the acyl phosphine, commercialized Lucirin® TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, however the examples of the photo-polymerization initiator is not limited to or by these.

The "hydrous gel phase polymer" is a polymer obtained by polymerizing certain monomers, and it means a gel-type polymer including a certain content of water. In the method of preparing the superabsorbent polymer, the hydrous gel phase polymer having a moisture content of 40 to 80 weight % which is prepared by thermal polymerizing or photo-polymerizing the monomer composition including the water-soluble ethylene-based unsaturated monomer and the polymerization initiator may be used.

Throughout the present specification, "moisture content" means the content of moisture in the weight of the whole hydrous gel phase polymer, and specifically it means the value of the weight of the dried polymer subtracted from the weight of the hydrous gel phase polymer. Furthermore, the moisture content may be defined as a value calculated by measuring weight loss as water is evaporated from the polymer during the drying process by elevating the temperature of the polymer through infrared heating. At this time, the moisture content is measured by carrying out the drying process with the drying condition of elevating the temperature from room temperature to 180° C. and maintaining the temperature at 180° C., wherein the total drying time is set as 20 minutes including 5 minutes of the temperature increase step.

Furthermore, every monomer usually used to prepare the superabsorbent polymer may be used as the water-soluble ethylene-based unsaturated monomer without limitation. At least one selected from the group consisting of an anionic monomer and a salt thereof, a nonionic hydrophilic monomer, and an amino group-containing unsaturated monomer and the quaternary compound thereof may be used.

As a specific example of the water-soluble ethylene-based unsaturated monomer, at least one selected from the group consisting of an anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, and polyethylene glycol (meth)acrylate; and an amino group-containing unsaturated monomer such as (N,N)-dimethylaminoethyl (meth)acrylate and (N,N)-dimethylaminopropyl(meth)acrylate, and a quaternary compound thereof may be preferably used.

Preferably, acrylic acid or a salt thereof may be used as the water-soluble ethylene-based unsaturated monomer, and there is an advantage that a superabsorbent polymer having improved water absorptivity can be obtained by using the acrylic acid or the salt thereof as the monomer.

Meanwhile, the concentration of the water-soluble ethylene-based unsaturated monomer in the monomer composition may be suitably determined by considering the polymerization time and the reaction conditions, and it may preferably be 40 to 55 weight %. When the concentration of the water-soluble ethylene-based unsaturated monomer is less than 40 weight %, it is disadvantageous in the aspect of economic feasibility, and when the concentration is larger than 55 weight %, the milling efficiency in the milling process of the polymerized hydrous gel phase polymer may become low.

Meanwhile, a general method may be used without limitation if the method can prepare a hydrous gel phase polymer from such monomer composition by thermal polymerization or photo-polymerization. Specifically, the polymerization method is largely classified into the thermal polymerization and the photo-polymerization according to the polymerization energy source, and the thermal polymerization may be carried out in a reactor like a kneader equipped with agitating spindles and the photo-polymerization may be carried out in a reactor equipped with a movable conveyor belt, however the polymerization methods disclosed above are just examples and the present invention is not limited to or by said methods.

For example, the hydrous gel phase polymer obtained from the thermal polymerization in a reactor like a kneader equipped with the agitating spindles disclosed above by providing hot air thereto or heating the reactor may have the size of centimeters or millimeters when it is discharged from the outlet of the reactor, according to the type of agitating spindles equipped in the reactor. Specifically, the size of the obtained hydrous gel phase polymer can be variously shown according to the concentration of the monomer composition fed thereto, the feeding speed, and the like, and the hydrous gel phase polymer of which the weight average particle diameter is 2 to 50 mm can be generally obtained.

Furthermore, in the case of the photo-polymerization carried out with a reactor equipped with a movable conveyor belt disclosed above, the obtained hydrous gel phase polymer may be a sheet-type hydrous gel phase polymer having the same width as the belt. At this time, the thickness of the polymer sheet may vary according to the concentration of the monomer composition fed thereto and the feeding speed, and it is preferable to provide the monomer composition so that a sheet-type hydrous gel phase polymer having a width of 0.5 to 5 cm is obtained. It is not preferable for the monomer composition to be fed so that the thickness of the sheet-type polymer becomes too thin because the production efficiency is low, and when the thickness of the sheet type polymer is larger than 5 cm, the polymerization reaction may not occur evenly throughout the whole thickness due to its excessive thickness.

Meanwhile, the hydrous gel phase polymer obtained according to the thermal polymerization or the photo-polymerization disclosed above passes through a drying step, and it may further pass through a pulverizing step before the drying step for raising the efficiency of the drying step, as occasion demands.

A general pulverizing device may be used in the pulverizing step before the drying step without limitation if the device can be used for pulverizing the hydrous gel phase resin, and for example, any one or more devices selected from the group consisting of a vertical pulverizer, a turbo cutter, a turbo grinder, a rotary cutter mill, a cutter mill, a disc mill, a shred crusher, a crusher, a chopper, and a disc cutter may be used.

In the pulverizing step before the drying step, the hydrous gel phase polymer obtained according to the thermal polymerization or the photo-polymerization disclosed above may be pulverized so that the weight average particle diameter becomes 2 mm to 10 mm. When the weight average particle diameter is less than 2 mm, the particles may agglomerate and it is technically not easy to pulverize the hydrous gel phase polymer to be less than 2 mm due to its high moisture content. Furthermore, when the weight average particle diameter is larger than 10 mm, the increasing effect of the efficiency of the succeeding drying step may be insignificant.

Meanwhile, in the pulverizing step before the drying step, the hydrous gel phase polymer may stick to the surface of the pulverizing device because it has a high moisture content. Accordingly, a certain additive may be added to the hydrous gel phase polymer for raising the efficiency of the pulverizing step before the drying step.

The kind of the usable additive is not particularly limited, and for example, it may be an anti-agglomeration agent for the fine powder such as steam, water, a surfactant, an inorganic powder such as clay or silica, and the like; a thermal polymerization initiator such as a persulfate-based initiator, an azo-based initiator, hydrogen peroxide, ascorbic acid, and the like; or a cross-linking agent such as an epoxy-based cross-linking agent, a diol-based cross-linking agent, a cross-linking agent including 2-functional or poly-functional (3 or more -functional) acrylate, or a mono-functional compound including a hydroxyl group.

When the hydrous gel phase polymer obtained according to the thermal polymerization or the photo-polymerization or the hydrous gel phase polymer pulverized in the pulverizing step before the drying step passes through the drying step, the drying temperature of the drying step may be 150° C. to 250° C. Said "drying temperature" may mean the temperature of the heating medium provided thereto for drying, or the temperature of the drying reactor including the heating medium and the polymer during the drying process.

When the drying temperature is lower than 150° C., there is a concern that the drying time becomes excessively long or the properties of the superabsorbent polymer finally formed may be deteriorated, and when the drying temperature is higher than 250° C., only the surface of the polymer is dried, and thus there is a concern that fine powder may be generated and the properties of the superabsorbent polymer finally formed may be deteriorated, The drying temperature may preferably be 150° C. to 200° C., and more preferably 160° C. to 180° C.

The time for the drying step may be suitably controlled considering the amount or the properties of the superabsorbent polymer being prepared, the size of the reactor, and so on, and the drying step may be carried out for 20 to 90 minutes, considering the process efficiency.

Furthermore, any generally known method or device may be used in the drying step without limitation if it can be used for drying the hydrous gel phase polymer, and for example, the drying step may be carried out by a method of supplying hot air, irradiating infrared rays, irradiating microwaves, irradiating ultraviolet rays, and the like.

When the drying step disclosed above is finished, the moisture content of the hydrous gel phase polymer may be 0.1 to 10 weight %.

Meanwhile, the polymer obtained from the drying step may pass through a certain milling step. The details of a milling device that can be used in the milling step are not particularly limited, and for example, a pin mill, a hammer mill, a screw mill, a roll mill, a disc mill, a jog mill, and the like may be used. The polymer powder obtained from the milling step may have a weight average particle diameter of 150 to 850 μm.

Meanwhile, s classifying step for obtaining the milled polymer of which the weight average particle diameter is 150 to 850 μm may be additionally carried out before the step of milling the polymer obtained from the drying step and adding the surface cross-linking agent thereto. The properties of the superabsorbent polymer powder finally manufactured can be properly controlled through such classifying step, and only a polymer powder having a weight average particle diameter of 150 to 850 μm obtained in the classifying step is selectively applied to the surface cross-linking reaction and finally manufactured.

A vibration classifier may be used in the classifying step, however it is not limited to or by this. The classifier may be a quadrangular or circular classifier, and a cyclone using a fluidized bed may be used.

Meanwhile, a surface cross-linking agent may be added for the surface cross-linking of the milled polymer powder. The surface cross-linking agent is not particularly limited as long as it is a compound that can react to the functional group of the milled polymer, and for preferable examples, there are a polyhydric alcohol compound, an epoxy compound, a polyamine compound, a haloepoxy compound, a condensation product of the haloepoxy compound, an oxazoline compound, a mono-, di-, or polyoxazolidinone compound, a cyclic urea compound, a polyvalent metal salt, an alkylene carbonate compound, and a mixture of two or more of said compounds.

More specifically, as examples of the polyhydric alcohol compound, there is a mono-, di-, tri-, tetra-, or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, 1,2-cyclohexane dimethanol, or a mixture of two or more of said compounds.

As examples of the epoxy compound, ethylene glycol diglycidyl ether and glycidol may be used, and as the polyamine compound, there is ethylene diamine, diethylene triamine, triethylene triamine, tetraethylene pentamine, pentaethylene hexamine, polyethylene amine, polyamide polyamine, or a mixture of two or more of said compounds.

Meanwhile, epichlorohydrin, epibromohydrin, and α-methylephichlorohydrin may be used as the haloepoxy compound. 2-oxazolidinone may be used as the mono-, di,- or polyoxazolidinone compound. Ethylene carbonate may be used as the alkylene carbonate compound.

In order to raise the efficiency of the surface cross-linking reaction process, it is preferable to use one or more polyhydric alcohol compounds among said cross-linking agent, and it is more preferable to use a $C_2$-$C_{10}$ polyhydric alcohol compound.

The amount of the surface cross-linking agent used may be suitably controlled according to the kind of surface cross-linking agent, the characteristics of the milled polymer, or the surface cross-linking reaction conditions, and the amount may be 0.001 to 5 parts by weight, preferably 0.01 to 3 parts by weight, and more preferably 0.05 to 2 parts by weight per 100 parts by weight of the milled polymer. When the amount of the surface cross-linking agent used is too small, the surface cross-linking reaction may not occur practically, and when the surface cross-linking agent is used excessively, the absorptivity and the properties of the final product may be decreased due to excessive surface cross-linking reaction.

The method of adding the surface cross-linking agent to the milled polymer is not particularly limited, and for example, a method of feeding the surface cross-linking agent and the milled polymer powder to the reactor and mixing the same, spraying the surface cross-linking agent to the polymer powder, or mixing the milled polymer powder and the cross-linking agent while continuously feeding the same to a mixer being continuously operated may be used.

At this time, the surface cross-linking agent may be added by mixing it with additional water. When water is added to the surface cross-linking agent, the surface cross-linking agent can be evenly dispersed in the polymer. The amount of water added thereto may be 0.5 to 10 parts by weight per 100 parts by weight of the milled polymer for the purpose of inducing uniform dispersion of the surface cross-linking agent, preventing agglomeration of the polymer powder, and optimizing the surface penetrating depth of the cross-linking agent at the same time.

Meanwhile, the surface temperature of the milled polymer may be 20 to 90° C. in the step of adding the surface cross-linking agent. The temperature of the milled polymer may be elevated to the surface cross-linking reaction temperature at a speed of 3° C./min to 15° C./min so that proper surface cross-linking reaction occurs, and the surface temperature of the milled polymer may be 20 to 90° C., and preferably 20 to 60° C., for securing proper properties of the final product. In order for the milled polymer to have the temperature of said range, the succeeding process may be continuously carried out after the drying step which is carried out at a relatively high temperature, the latter process time is reduced, or the polymer is heated separately when it is difficult to reduce the process time.

Furthermore, in addition to the method of maintaining or controlling the surface temperature of the milled polymer in a proper range, the temperature of the surface cross-linking agent itself added thereto may be controlled to be 10 to 90° C., and preferably 20° C. to 60° C. By heating the surface cross-linking agent or controlling the temperature of the same, the temperature can be elevated with a speed of 3° C./min to 15° C./min to the surface cross-linking reaction temperature, the surface cross-linking reaction can be properly carried out, and the proper properties of the final product can be obtained. When the temperature of the surface cross-linking agent is lower than 10° C., the properties of the superabsorbent polymer may be deteriorated because the absorption speed of the surface cross-linking agent is late and the penetration depth of the surface cross-linking is shallow, and the effect of shortening the temperature increase speed influences the surface cross-linking reaction according to the temperature increase may be insignificant. Furthermore, when the temperature of the surface cross-linking agent is higher than 90° C., the penetrating speed of the surface cross-linking agent may be excessively rapid or uniform mixing of the surface treating agent may be disturbed.

Meanwhile, various means for temperature increase may be used in the step of elevating the temperature of the polymer to which the surface cross-linking agent is added to the surface cross-linking reaction temperature, and for example, the temperature increase may be carried out by providing a heating medium or by directly providing a heat source.

As a specific example of the heating medium, a hot fluid such as steam, hot air, hot oil, and the like may be used, however the specific example is not limited to these. The temperature of the heating medium may be properly controlled by considering the means of the heating medium, the temperature increase speed, and the target temperature. As an example of the heat source provided directly, an electric heater or a gas heater may be used, but it is not limited to these. However, it is preferable that the heating medium has a temperature of 100° C. or more and that the heat source provides thermal energy at a temperature of 100° C. or more, considering that the surface cross-linking reaction temperature disclosed above is 100 to 250° C.

The surface cross-linking reaction may be carried out within a certain time, considering the cross-linking reaction temperature, the characteristics and the amount of the reactants, or the reaction conditions, and the cross-linking reaction may be carried out for 1 minute to 120 minutes, preferably for 1 minute to 60 minutes, and more preferably for 10 minutes to 50 minutes, after the temperature increase to the cross-linking reaction temperature is completed. When the reaction time is shorter than 1 minute, the cross-linking reaction cannot be sufficiently obtained, and when the cross-linking time is longer than 120 minutes, property deterioration may occur because the polymer particles are damaged by excessive surface cross-linking reaction.

According to the method of preparing the superabsorbent polymer disclosed above, the superabsorbent polymer of which a small amount of fine powder is generated, and not only are the water holding capacity and the absorbing power under pressure excellent, but a low the content of the water soluble component can be provided.

The problems with generating a lot of fine powder in the preparation method of superabsorbent polymer are that the work environment becomes poor, and the efficiency of the process and the quality of the superabsorbent polymer finally manufactured are decreased by the fine powder. However, according to the method of preparing the superabsorbent polymer disclosed above, it is possible to reduce the amount of fine powder generated in the preparation process, and particularly, it is possible to control the proportion of the superabsorbent polymer having a particle diameter of less than 150 μm to be less than 6 weight % after the surface cross-linking reaction. Accordingly, the method of preparing the superabsorbent polymer disclosed above can improve the process efficiency and the work environment by reducing the fine powder generation and can enhance the properties and the quality of the final product.

Further, in the case of the superabsorbent polymer prepared by the preparation method of the superabsorbent polymer disclosed above, it is recognized that the water holding capacity measured according to the EDANA WSP 241.2 method is 33 g/g or more, and the absorbing power under pressure measured by the EDANA WSP 242.2 method is 22 g/g or more, and thus its water holding capacity and absorbing power under pressure are superior. Furthermore, such a superabsorbent polymer shows a very low water-soluble component measured according to the EDANA WSP 270.2 method of 15 weight % or less, and it is expected to be used in industrial fields related to superabsorbent polymer preparation.

According to the present invention, the method of preparing the superabsorbent polymer of which the fine powder generation is small, and not only are the water holding capacity and the absorbing power under pressure excellent, but also the content of the water soluble component is low, and the superabsorbent polymer prepared by the same can be provided.

Hereinafter, the function and effect of the invention are explained in more detail through concrete examples of the present invention. However, the following examples are only for illustrating the present invention, and the scope of the present invention is not determined to or by them.

Preparation Example 1

Preparation of Polymer Powder

A monomer composition of which the monomer concentration was 50 weight % was prepared by mixing 100 g of acrylic acid, 0.1 g of polyethylene glycol diacrylate as a cross-linking agent, 38.9 g of caustic soda (NaOH), and 103.9 g of water.

Then, the monomer composition was provided on a continuously moving conveyor belt through a monomer feed section and 10 g of 3% sodium persulfate aqueous solution was mixed thereto as a polymerization initiator. The polymerization was started 1 minute after mixing the polymerization initiator, and the polymerization reaction was carried out for 4 minutes in the reactor of which the internal temperature was 99° C. The hydrous gel phase polymer (moisture content was 50%) polymerized in this way was transferred to a cutter and pulverized so that the weight average particle diameter of the hydrous gel phase polymer was 2 mm.

The pulverized and discharged hydrous gel phase polymer was then dried in a hot air dryer of 180° C. for 1 hour. Subsequently, the dried polymer was milled with a pin mill, and classified by using a sieve so as to obtain the milled polymer having a particle diameter of 150 to 850 μm.

The polymer powder prepared in this way showed water holding capacity of 41 g/g and the content of the water soluble component of 16%.

Examples

Example 1

Preparation of Superabsorbent Polymer 1.0 part by weight of 1,3-propanediol as a surface cross-linking agent and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted into a reactor of which the temperature was increased by an oil heater and an electric heater. At this time, the surface cross-linking reaction temperature was 180° C., the speed of the temperature increase was 3° C./min, and the surface cross-linking reaction time was 20 minutes after the temperature was elevated to 180° C.

Example 2

Preparation of Superabsorbent Polymer 1.0 part by weight of 1,3-propanediol as a surface cross-linking agent and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted into a reactor of which the temperature was increased by an oil heater and an electric heater. At this time, the surface cross-linking reaction temperature was 180° C., the speed of the temperature increase was 5° C./min, and the surface cross-linking reaction time was 20 minutes after the temperature was elevated to 180° C.

Example 3

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted into a reactor of which the temperature was increased by an oil heater and an electricity heater. At this time, the surface cross-linking reaction temperature was 180° C., the speed of the temperature increase was 10° C./min, and the surface cross-linking reaction time was 20 minutes after the temperature was elevated to 180° C.

Example 4

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted into a reactor of which the temperature was increased by an oil heater and an electric heater. At this time, the surface cross-linking reaction temperature was 200° C., the speed of the temperature increase was 7° C./min, and the surface cross-linking reaction time was 10 minutes after the temperature was elevated to 200° C.

Example 5

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 60° C. after the mixing process.

The mixed polymer was inserted into a reactor of which the temperature was increased by an oil heater and an electric heater. At this time, the surface cross-linking reaction temperature was 180° C., the speed of the temperature increase was 3° C./min, and the surface cross-linking reaction time was 20 minutes after the temperature was elevated to 180° C.

Comparative Examples

Comparative Example 1

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted into a reactor of which the temperature was increased by an oil heater and an electric heater. At this time, the surface cross-linking reaction temperature was 180° C., the speed of the temperature increase was 2° C./min, and the surface cross-linking reaction time was 20 minutes after the temperature was elevated to 180° C.

Comparative Example 2

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 30° C. after the mixing process.

The mixed polymer was inserted to a reactor of which the temperature was increased by an oil heater and an electric heater. At this time, the surface cross-linking reaction temperature was 180° C., the speed of the temperature increase was 20° C./min, and the surface cross-linking reaction time was 20 minutes after the temperature was elevated to 180° C.

Comparative Example 3

Preparation of Superabsorbent Polymer 1.0 part by weight of 1,3-propanediol and 1.0 part by weight of water were sprayed to and mixed with 100 parts by weight of the polymer powder prepared according to Preparation Example 1. The temperature of the polymer to which the surface cross-linking agent was added was 60° C. after the mixing process.

The mixed polymer was inserted into a reactor of which the temperature was increased by an oil heater and an electric heater. At this time, the surface cross-linking reaction temperature was 180° C., the speed of the temperature increase was 20° C./min, and the surface cross-linking reaction time was 20 minutes after the temperature was elevated to 180° C.

The surface cross-linking reaction conditions of the examples and comparative examples are listed in the following Table 1.

For reference, "surface cross-linking reaction temperature" in the examples and the comparative examples was disclosed as the average value of the temperatures at the time of passing 70%, at the time of passing 80%, and at the time of passing 90% of the total surface cross-linking reaction time of 100% after the surface cross-linking reaction was started.

|  | Temperature of polymer, after mixing surface cross-linking agent (° C.) | Temperature of surface cross-linking reaction (° C.) | Speed of temperature increase (° C./min) | Time of surface cross-linking reaction time (min) |
| --- | --- | --- | --- | --- |
| Example 1 | 30 | 180 | 3 | 20 |
| Example 2 | 30 | 180 | 5 | 20 |
| Example 3 | 30 | 180 | 10 | 20 |
| Example 4 | 30 | 200 | 7 | 10 |
| Example 5 | 60 | 180 | 3 | 20 |
| Comparative Example 1 | 30 | 180 | 2 | 20 |
| Comparative Example 2 | 30 | 180 | 20 | 20 |
| Comparative Example 3 | 60 | 180 | 20 | 20 |

Experimental Examples

Evaluation of Properties of Superabsorbent Polymer

Experimental Example 1

Particle Size Distribution

The particle size distribution of the product after the surface cross-linking reaction was measured by shaking the same for 10 minutes by using sieves having the mesh distribution of 20, 30, 50, 80, and 100 pan, and by using a shaker for measuring particle size distribution.

The weight of the polymer existing on each mesh was represented as a weight ratio to the total weight.

Experimental Example 2

Water Holding Capacity

The water holding capacity was measured for the particles classified by the method disclosed above. The measurement of the water holding capacity followed the EDANA WSP 241.2 method. After inserting 0.2 g of the specimen classified by 30~50 mesh in a tea bag and soaking the same in a 0.9% salt water solution for 30 minutes, the water holding capacity was measured by eliminating water from the specimen for 3 minutes by using a centrifugal separator set to 250 G and weighing the specimen so as to determine the amount of water held in the superabsorbent polymer.

Experimental Example 3

Water Soluble Component

The water soluble component was measured for the particles classified by the method disclosed above. The measurement of the water holding capacity followed the EDANA WSP 270.2 method. After inserting 1.0 g of the specimen classified by 30~50 mesh in 200 g of a 0.9% salt water solution and soaking the same while stirring at 500 rpm for 16 hours, the aqueous solution was filtered with a filter paper. The solution filtered in this way was primarily titrated to pH 10.0 with a 0.1N caustic soda solution and was then counter-titrated to pH 2.7 with a 0.1N hydrogen chloride solution, and the amount of polymer material not cross-linked was calculated from the amount needed for the neutralization.

Experimental Example 4

Absorbing Power Under Pressure

The absorbing power under pressure was analyzed by using a measuring device regulated in the EDANA WSP 242.2 method and a particle size distribution of 150~850 μm.

The properties of superabsorbent polymers prepared according to the examples and the comparative examples are listed in the following Table 2.

and low content of water soluble components at the same time, in comparison with the superabsorbent polymers according to the comparative examples.

The water holding capacity and the absorbing power under pressure of the superabsorbent polymer relate to the evaluation on the moisture absorbing performance, they relate to basic performance of the superabsorbent polymer, and the water soluble component relates to the content of the component that is soluble in water in the superabsorbent polymer, for example, to the content of a low molecular weight polymer component.

Generally, the properties of the superabsorbent polymer can be evaluated as being superior as the water holding capacity and the absorbing power under pressure are higher, and when the superabsorbent polymer is applied to a consumer good like a diaper, there is less displeasure of a user due to wetness, and the property of the superabsorbent polymer can be evaluated as being superior as the amount of the water soluble component is lower. However, it is generally known that the higher the water holding capacity, the higher the content of the water soluble component, and there have been difficulties in improving overall properties of the superabsorbent polymer.

However, it is recognized that the superabsorbent polymer prepared in Examples 1 to 5 can maintain the low content of the water soluble component while having high water holding capacity and absorbing power under pressure. In addition, since the superabsorbent polymers according to the examples realize superior characteristics disclosed above and the amount of the fine powder (particle diameter less than 150 μm) generated after the surface cross-linking reaction is very small, specifically the ratio of the superabsorbent polymer having the particle diameter of less than 150 μm after the surface cross-linking reaction can be controlled to be less than 6 weight %, the process efficiency and the work environment can be improved, and the properties and the quality of the final product can be improved.

|  | Particle size distribution: weight ratio of particles having particle diameter less than 150 μm (%) | Water holding capacity (g/g) | Water soluble component (wt %) | Absorbing power under pressure (g/g) |
|---|---|---|---|---|
| Example 1 | 5.5 | 34.1 | 14.6 | 22.6 |
| Example 2 | 3.6 | 34.6 | 14.2 | 23.4 |
| Example 3 | 1.2 | 33.4 | 12.6 | 24.1 |
| Example 4 | 1.6 | 33.1 | 12.3 | 24.4 |
| Example 5 | 1.5 | 33.6 | 13.7 | 23.7 |
| Comparative Example 1 | 7.3 | 34.5 | 15.8 | 21.7 |
| Comparative Example 2 | 3.0 | 33.1 | 15.6 | 22.4 |
| Comparative Example 3 | 1.9 | 33.9 | 16.6 | 22.9 |

From the results disclosed above, it is recognized that there is a tendency for the amount of fine powder of less than 150 μm to increase and the water soluble component to increase when the temperature increase speed to the surface cross-linking reaction temperature is slow. Further, when the temperature increase speed to the surface cross-linking reaction temperature is fast, a decrease of absorbing power under pressure (AUP) is shown, which seems to come from an insufficient time for the surface cross-linking agent to be distributed in and to penetrate into the inside and the surface of the polymer.

Meanwhile, it can be recognized that the superabsorbent polymers prepared according to the examples have high water holding capacity and absorbing power under pressure (AUP),

What is claimed is:

1. A method of preparing a superabsorbent polymer, including the steps of:

preparing a hydrous gel phase polymer by thermal polymerizing or photo-polymerizing a monomer composition including a water-soluble ethylene-based unsaturated monomer and a polymerization initiator;

drying the hydrous gel phase polymer;

milling the dried polymer;

adding a surface cross-linking agent to the milled polymer; and elevating the temperature of the polymer including the surface cross-linking agent at a speed of 3° C./min to 15° C./min, and carrying out a surface cross-linking reaction at 100° C. to 250° C.

2. The method of preparing a superabsorbent polymer according to claim 1, wherein the moisture content of the thermal polymerized or photo-polymerized hydrous gel phase polymer is 40 to 80 weight %.

3. The method of preparing a superabsorbent polymer according to claim 1, wherein the moisture content of the dried polymer is 0.1 to 10 weight %.

4. The method of preparing a superabsorbent polymer according to claim 1, further including the step of pulverizing the hydrous gel phase polymer so that the weight average particle diameter is 2 to 10 mm, before the drying step of the hydrous gel phase polymer.

5. The method of preparing a superabsorbent polymer according to claim 1, wherein the drying step of the hydrous gel phase polymer is carried out at a temperature of 150° C. to 250° C.

6. The method of preparing a superabsorbent polymer according to claim 1, wherein the milling step of the dried polymer is carried out so that the weight average particle diameter of the milled polymer is 150 to 850 μm.

7. The method of preparing a superabsorbent polymer according to claim 1, further including the step of classifying the milled polymer so that the weight average particle diameter is 150 to 850 μm, before the step of adding the surface cross-linking agent to the milled polymer.

8. The method of preparing a superabsorbent polymer according to claim 1, wherein the surface cross-linking agent is at least one selected from the group consisting of a polyhydric alcohol compound, an epoxy compound, a polyamine compound, a haloepoxy compound, a condensation product of the haloepoxy compound, an oxazoline compound; a mono-, di-, or polyoxazolidinone compound, a cyclic urea compound, a polyvalent metal salt, and an alkylene carbonate compound.

9. The method of preparing a superabsorbent polymer according to claim 1, wherein 0.001 to 5 parts by weight of the surface cross-linking agent is added to 100 parts by weight of the milled polymer.

10. The method of preparing a superabsorbent polymer according to claim 1, wherein the surface temperature of the milled polymer is 20 to 90° C. in the step of adding the surface cross-linking agent.

11. The method of preparing a superabsorbent polymer according to claim 1, wherein the temperature of the added surface cross-linking agent is 10 to 90° C.

12. The method of preparing a superabsorbent polymer according to claim 1, wherein the surface cross-linking reaction is carried out for 1 minute to 120 minutes.

13. The method of preparing a superabsorbent polymer according to claim 1, wherein the temperature increase for the surface cross-linking reaction is carried out by providing a heating medium or by directly providing a heat source.

14. The method of preparing a superabsorbent polymer according to claim 1, wherein the ratio of the superabsorbent polymer having the particle diameter of less than 150 μm is less than 6 weight % after the surface cross-linking reaction.

15. The method of preparing a superabsorbent polymer according to claim 1, wherein the water holding capacity measured according to the EDANA WSP 241.2 method is 33 g/g or more, and the absorbing power under pressure measured by the EDANA WSP 242.2 method is 22 g/g or more.

16. The method of preparing a superabsorbent polymer according to claim 1, wherein the water-soluble component of the superabsorbent polymer measured according to the EDANA WSP 270.2 method is 15 weight % or less.

* * * * *